United States Patent
Risen, Jr. et al.

(10) Patent No.: US 7,767,063 B2
(45) Date of Patent: *Aug. 3, 2010

(54) PHOTO-FORMED METAL NANOPARTICLES AND AEROGEL MATERIALS COMPRISING THE SAME

(75) Inventors: William M. Risen, Jr., Rumford, RI (US); Xipeng Liu, East Providence, RI (US); Chunhua Yao, Providence, RI (US); Yu Zhu, Knoxville, TN (US)

(73) Assignee: Brown University, Providence, RI (US)

( * ) Notice: Subject to any disclaimer, the term of this patent is extended or adjusted under 35 U.S.C. 154(b) by 379 days.

This patent is subject to a terminal disclaimer.

(21) Appl. No.: 11/773,079

(22) Filed: Jul. 3, 2007

(65) Prior Publication Data

US 2009/0127492 A1 May 21, 2009

Related U.S. Application Data

(63) Continuation of application No. 10/998,228, filed on Nov. 26, 2004, now Pat. No. 7,238,261.

(60) Provisional application No. 60/525,504, filed on Nov. 26, 2003.

(51) Int. Cl.
*C07C 1/00* (2006.01)
*C07C 209/68* (2006.01)
*B01J 19/12* (2006.01)
*C01B 25/00* (2006.01)
*C01B 31/00* (2006.01)
*C01B 13/00* (2006.01)
*C01B 4/00* (2006.01)
*C07F 3/00* (2006.01)
*C07F 7/12* (2006.01)
*C07F 3/10* (2006.01)
*C01C 1/00* (2006.01)

(52) U.S. Cl. .............. 204/157.15; 204/157.4; 204/157.45; 204/157.46; 204/157.47; 204/157.5; 204/157.52; 204/157.6; 204/157.74; 204/157.75; 204/157.81; 204/157.82

(58) Field of Classification Search ............ 204/157.15, 204/157.4, 157.45, 157.46, 157.47, 157.5, 204/157.52, 157.6, 157.74, 157.75, 157.81, 204/157.82

See application file for complete search history.

(56) References Cited

U.S. PATENT DOCUMENTS 7,238,261 B2 * 7/2007 Risen et al. .............. 204/157.6

OTHER PUBLICATIONS

Hund et al., "Formation and Entrapment of Noble Metal Clusters in Silica Aerogel Monoliths by .gamma.-Radiolysis", J. Phys. Chem. B (no month, 2003), vol. 107, pp. 465-469.*

* cited by examiner

*Primary Examiner*—Edna Wong
(74) *Attorney, Agent, or Firm*—Richard M. Klein; Fay Sharpe LLP

(57) ABSTRACT

Transparent monolithic aerogels based on silica, the bio-derived polymer chitosan, and coordinated ions are employed to serve as a three-dimensional scaffold decorated with metal ions such as Au, Pt and Pd ions. It has also been found that the metal aerogels, such as Au(III) aerogels, can be imaged photolytically to produce nanoparticles.

8 Claims, No Drawings

PHOTO-FORMED METAL NANOPARTICLES AND AEROGEL MATERIALS COMPRISING THE SAME

CROSS REFERENCES TO RELATED APPLICATIONS

The present application is a continuation application of U.S. patent application Ser. No. 10/998,228, filed Nov. 26, 2004, now U.S. Pat. No. 7,238,261. That application claimed priority to U.S. Provisional Application Ser. No. 60/525,504, filed Nov. 26, 2003. Both disclosures are incorporated herein by reference.

FIELD OF THE INVENTION

The present invention relates to the formation of metal nanoparticles, such as gold (Au) nanoparticles, formed from photolytically modified (i.e., U.V. irradiated) metal ion-containing aerogels. The development also relates to the use of the metal nanoparticles in various analytical, isolation and chemical transformation processes. The development further relates to the formation of ferromagnetic aerogels that also contain metal nanoparticles.

BACKGROUND OF THE INVENTION

An aerogel is a gel which has a lower density than the fully condensed form of the material comprising the gel. Aerogels typically are produced by replacing the liquid of a gel by air or another gas without allowing complete collapse of the structure. The seminal report on this was made by Kistler in 1931 (Nature, 127, 741 (1931)), who described the goal of the research as being "to test the hypothesis that the liquid in a jelly can be replaced by a gas with little or no shrinkage." This early work led to aerogels through the use of supercritical fluids to extract liquid, and it led to the hypothesis that the gel structure itself can be preserved in the supercritical drying process, as disclosed by Marshall in U.S. Pat. No. 285,449 (1942).

There have been many successes in the aerogel field, as disclosed in the scientific and technical literature and in patents. Of relevance to the current disclosure is the area known in some contexts as Organically Modified Ceramics, referred to as ORMOCERS or called CERAMERS, which have been widely studied. A descriptive review of this area is that of R. C. Mehrotra (Present Status and Future Potential of the Sol-Gel Process, Chapter 1 in Chemistry, *Spectroscopy and Applications of Sol-Gel Glasses, Structure and Bonding Series* 77, Eds. R Reisfeld and C. K. Jorgensen, Springer-Verlag, Berlin, 1992). This reference points to the distinction between composite materials that are mixed at the molecular level and those that have mechanically combined components. This reference also discusses work directed to organically modified gels in the form of aerogels and their subsequently dried, fused, oxidized and otherwise treated forms. Also of relevance are works concerning aerogels and their applications. The book *Aerogels* edited by J. Fricke (Springer Proceeding in Physics 6, Springer-Verlag, Berlin, 1985), the book *Sol-Gel Science, The Physics and Chemistry of Sol-Gel Processing* by C. J. Brinker and G. W. Scherer (Academic Press, Inc. Harcourt Brace Jovanovich, Publ., New York, 1990) and the book *Sol-Gel Technology for Thin Films, Fibers, Preforms, Electronics and Specialty Shapes*, Ed. L. C. Klein (Noyes, Park Ridge, N.J., 1988) are of relevance and show the great importance attached to the formation of aerogels with specific properties and functions.

Examples of aerogels which contain or have added to them, metal ions or metal containing species are known. Those known fall into several categories, including: (1) a silica aerogel that has been dipped into a solution or dispersion containing the metal ion source; (2) a polymer matrix aerogel, such as a polyacrylonitrile aerogel, that contains metal ions added to the aerogel or to the gel before formation of the aerogel (e.g. L. M. Hair, L. Owens, T. Tillotson, M. Froba, J. Wong, G, J. Thomas, and D. L. Medlin, J. Non-Crystalline Solids, 186, 168 (1995), and S. Ye, A. K. Vijh, Z-Y Wang, and L. H. Dao, Can. J. Chem. 75, 1666 (1997)); or (3) a silica aerogel having metal ions (e.g. M. A. Cauqui, J. J. Calvino, G. Cifredo, L. Esquivias, and J. M. Rodriguez-Izquierdo, J. Non-Crystalline Solids, 147&148, 758 (1992)) or small metal compounds bound in it (e.g. Y. Yan, A. M. Buckley and M. Greenblatt, J. Non-Crystalline Solids, 180, 180 (1995)).

The use of supported metal and metal ions for catalysis is known, and many reports exist in the scientific, technical, engineering, and patent literature. Relevant studies include "The Chemistry of Ruthenium in PSSA Ionomer: Reactions of Ru—PSSA with CO, $H_2$ and $O_2$ and Alcohols" (I. W. Shim, V. D. Mattera, Jr., and W. M. Risen, Jr., Journal of Catalysis, 94, 531 (1985), which includes a report of a static Fischer—Tropsch reaction catalysis by supported ruthenium under mild conditions of 150° C. and 600 Torr total pressure, "A Kinetic Study of the Catalytic Oxidation of CO over Nafion-Supported Rhodium, Ruthenium, and Platinum", by V. D. Mattera, Jr., D. M. Barnes, S. N. Chaudhuri, W. M. Risen, Jr., and R. D. Gonzalez, Journal of Physical Chemistry, 90, 4819 (1986), which shows this catalysis, and "Chemistry of Metals in Ionomers: Reactions of Rhodium-PSSA with CO, $H_2$, and $H_2O$", Inorganic Chemistry, 23, 3597 (1984), which shows relationships between spectroscopic observations on supports that have been exposed to these gases and the compounds formed and the oxidation states of rhodium species.

Additionally, metal nanoparticles, formed as colloids by reactions in solutions and suspensions, are also known. They have been produced by chemical reductions and photolytically induced-reductions applied to solutions of salts of Au(III), Pt(II), Pd(II) and other metal ions. Chemical reductions are the most common, with such reactions as the citric acid reduction of Au(III) salts being among the most frequently used methods to obtain gold nanoparticles, but photolytic methods using γ-ray or ultraviolet irradiation have been reported as well. For example, ultra fine metal particles have been prepared by Itakura et al., T. Itakura, K. Torigoe and K. Esumi, *Langmuir*, 11, 4129-4134 (1995), by UV irradiation of salts dissolved in ethanol. The reaction is accelerated by using benzoin as a photoinitiator; indeed, the observed gold nanoparticle size changes from 7 nm to 17 nm with increasing benzoin concentration.

Nanoparticles have been formed in solid matrices of soft materials as well. For example, nanoparticles of Pt, Rh, Ru and Ag, have been obtained by chemical reduction in ionomer matrices, V. D. Mattera, Jr., D. M. Barnes, S. N. Chaudhuri, and W. M. Risen, Jr., *J. Phys. Chem.*, 90, 4819 (1986); and, D. M. Barnes, S. N. Chaudhuri, G. D. Chryssikos, V. D. Mattera, Jr., S. L. Peluso, I. W. Shim, A. T. Tsatsas, and W. M. Risen, Jr., *ACS Symposium Series* No. 302, 66 (1986).

Studies of gold nanoparticles have been quite helpful for understanding molecular adsorption onto their surfaces and for utilizing these adsorption reactions for detection and other applications. In some cases, the adsorption reactions are used to control or at least found to control the sizes of the particles formed during the reduction process, because the adsorbed molecules can compete with the growth process for the addition of atoms to the surface of nucleated Au(0) clusters. For example, a gold sol was obtained by Pal, A. Pal, *Talanta*, 46, 583-587 (1998), by UV irradiation of $HAuCl_4$ in aqueous Triton X-100, which acts as both a reductant and a stabilizer. Without it, gold (III) failed to form gold particles after extensive irradiation. In addition, Au colloids have been prepared by reduction of metal salts with UV irradiation in the presence of dendrimers. Thus, Esumi et al., K. Esumi, A. Suzuki, N. Aihara, K. Usui, and K. Torigoe, *Langmuir* 14, 3157-3159 (1998), studied their production in the presence of poly(amidoamine), which has surface amino groups. The average particle size decreased with increasing concentration of surface amino groups. At a surface amino group to $HAuCl_4$ mole ratio of 1:1, the particle size was in the 2-18 nm range, with a broad distribution, but when the ratio was increased to 4:1, monodispersed gold particles of less than 1 nm were obtained because the colloids were protected by the dendrimers from aggregation.

Prior studies have shown that it is possible to obtain gold particles in aerogels by other methods, but none known to the inventors has lead to the light-induced production of Au(0) from coordinated Au(III) ions in an aerogel. Among the earlier studies is formation of noble metal clusters (Ag, Au) in a silica aerogel matrix by γ-irradiation of its hydrogel precursors loaded with an aqueous solution containing Ag ion or $[AuCl_4]^-$ ions, J. F. Hund, M. F. Bertino, G. Zhang, C. Sotiriou-Leventis, N. Leventis, A. T. Tokuhiro, and J. Farmer, *J. Phys. Chem. B*, 107, 465-469 (2003). This work by Hund, et al. showed that clusters and particles in the 10 to 200 nm range could be formed. Gold nanoparticles dispersed inside the pores of monolithic mesoporous silica were prepared by soaking it in a gold (III) ion solution and subsequently subjecting it to ultrasonic irradiation. In that work by Fu et al., G. Fu, W. Cai, C. Kan, C. Li, and Q. Fang, *J. Phys. D: Appl. Phys.* 36 1382-1387 (2003), it was found that the nanoparticles actually were formed in solution first and then diffused into the pores. Anderson et al., M. A. Anderson, C. A. Morris, R. M. Stroud, C. I. Merzbecher, D. R. Rolison, *Langmuir*, 15, 674 (1999), presented a direct method to incorporate Au colloidal particles (either 5 or 28 nm) in a silica aerogel network structure by simply adding an Au sol, prepared by citrate reduction of $HAuCl_4$, to a silica sol and then converting this to a composite.

Nanoparticles in colloidal suspensions or spread on surfaces, are available for further reaction, including reactions to carry out diagnostic assays and protein research. For instance, biotinylated thiol formed self-assembled monolayers on gold colloids and the composites produced were used for molecular recognition of avidin, based on the specific binding between biotin and avidin (streptavidin) (L. Haussling, H. Ringsdorf, F. J. Schmitt and W. Knoll, Langmuir, Vol. 7, No. 9 (1991) and C.-M. Pradier, M. Salmain, Z. Liu and C. Methivier, Surface and interface analysis 34, 67-71 (2002)). Niemeyer et al. (C. M. Niemeyer and B. Ceyhan, Angew. Chem. Int. Ed., 40, No. 19, 3685-3688 (2001)) reported a DNA-directed absorption of proteins on colloidal gold. This is part of an approach to using the protein coated gold compounds as reagents to detect proteins in an immunoassay. In the same vein, Mirkin and coworkers (R. Elghanian, J. J. Storhoff, R. C. Mucic, R. I. Letsinger, Chad A. Mirkin, Science, 277, 1078-1081 (1997)) reported a selective colorimetric polynucleotide detection method, based on the optical properties of gold nanoparticles.

There are a number of potential applications, especially in medicine, for small particles that are both ferromagnetic (or superparamagnetic) and can interact in such a selective manner with biologically active molecules. A particular one involves binding a molecule of interest in the blood or other physiologically interesting fluid system to the particles and then separating these particles from that system by magnetic separation. One approach to forming a material that will achieve this is to form magnetic particles, coat them in a biocompatible coating, such as Au or a polymer, and then derivatize the outer surface so that they will bind to the molecule(s) of interest (Berry, C. C and Custins, A. S. G., Phys. D: Appl. Phys 36(13) R198 (2003) and P, Gould, Materials Today, Feb 36 (2004)). Another application involves enhancement of magnetic resonance images (MRI) in diagnosis, while another involves selectively locating treatment agents, whether chemical or radiological, in particular areas to be treated.

As promising as the prior work has been, challenges remain. Some are associated with the size of nanoparticles and attendant issues, such as their removal and their potential deleterious transport in mammalian systems. Others have to do with the instability, indeed combustibility, of nanoscale metal particles in air, and their tendency to clump together.

In the present invention, a way to achieve the goal of obtaining a generally and selectively absorptive material that is ferromagnetic has been discovered. It combines (1) the generalized absorption capacity of silica-based polymer-silica hybrid aerogel with (2) the discovery that gold nanoparticles with specific adsorption capability can be produced directly by ultraviolet irradiation of Au ion-containing aerogels and (3) the discovery that well-dispersed ferromagnetic particles can be produced in these aerogels and their particles. The aerogel particles can be of any size from about the 100 nm range up to larger monolithic structures.

It also has been discovered that gold nanoparticles can be produced in or on the polymer-silica hybrid aerogel monoliths by ultraviolet irradiation so that spatially controlled arrays of such particles can be produced. It has further been discovered that gold ion-containing aerogel particles can be irradiated with ultraviolet light to produce aerogel particles comprising Au nanoparticles.

These and other aspects and/or objects of the disclosure are more particularly described below.

SUMMARY OF THE INVENTION

In one aspect, the present disclosure concerns the production of metal, such as gold (Au), nanoparticles from a metal ion-containing aerogel by photolytical processes such as ultraviolet light irradiation.

In another aspect, the present development relates to the formation of Au(0) nanoparticles from Au(III) containing aerogels, such as aerogels comprising about 90% silica and 10% chitosan. In this regard, a series of Au(III)-chitosan-silica aerogels were formed at compositions defined by the ratio of Au(III) ions to $NH_2$ groups on the chitosan polymer. These were then subjected to ultraviolet radiation alone and in the presence of thiols and disulfides, including ones of biological interest, that can absorb on Au(0) nanoparticles. Their properties were then investigated by spectroscopic and transmission electron microscopy (TEM). Optionally, ferromagnetic particles may also be included in the Au(III) containing aerogels to produce, subsequent to irradiation, magnetic Au(0) nanoparticles. Further, ferromagnetic particles may be produced in Au(0)-containing aerogels produced photolytically.

In a further aspect, the present disclosure concerns a process for producing metal nanoparticles. The process involves the steps of providing a metal ion-containing aerogel and irradiating at least a portion of the metal ion-containing aerogel with ultraviolet light at a wavelength of from about 50 nm to about 400 nm to produce metal nanoparticles. Preferably, the metal ion-containing aerogels also includes ferromagnetic particles to produce magnetic metal ion based nanoparticles.

In an additional aspect, the development relates to monolithic aerogel materials comprising metal nanoparticles arrayed in a pattern, and processes for forming and using the same.

In still another aspect, the development relates to a metal nanoparticle containing aerogel reacted with an iron precursor and heated to form ferromagnetic aerogel particles containing metal nanoparticles.

Further scope of the applicability of the present disclosure will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DESCRIPTION OF THE PREFERRED EMBODIMENTS

The present disclosure concerns the formation of aerogels containing metal nanoparticles, formed photolytically, and, optionally, ferromagnetic or superparamagnetic particles.

These monolithic aerogels in accordance with the present invention possess a number of properties that lead to novel applications. They have high surface areas and high void volumes related to their low densities. Monolith is a word used in its conventional sense, as "a single stone or block of stone" (Webster's New Collegiate Dictionary), in order to distinguish the materials of this invention (before any intentional fracturing, powdering or other mechanical processes) from the types of small particles or aggregate particles commonly obtained in the prior art. Typically, the monoliths obtained are limited only by the size of the supercritical extraction equipment and pieces as large as about 50 mm×50 mm have been prepared. Their thicknesses may typically vary from about 0.02 mm to about 4 mm. Greater or lesser thicknesses are contemplated. The monolithic structure permits applications of these materials as optical elements of low refractive index, optical filters, gas and liquid absorbent materials, gas filters, as well as those that are possible with the smaller particles.

The term "polymer" as utilized herein generally refers to a macromolecular substance composed of repeating atomic groups, i.e. monomers. The term encompasses all types of polymers such as homopolymers, copolymers, dimers, trimers, oligomers, for example.

The aerogels of the present invention may comprise metal ions that can interact with reactive gases and unreactive but absorbable gases to yield a changed material whose changes can be probed to indicate the presence of the molecules. The aerogels may comprise metal ions that can interact with many dye molecules to immobilize them by a mordanting interaction. They may contain molecules, such as thiols, disulfides or biotinylated species that can interact with the metal ions, metal particles formed from them, or metallic species formed subsequently. Moreover, the aerogels can be transparent to light in regions of interest, such that they may be used as optical filters, active optical elements, and detectors based on the optical, magnetic, and magneto-optic and related properties of the metals and their surroundings. The aerogels of the present invention have pore sizes in the range of about 2 to about 6 nanometers, very high surface areas, and may comprise metals that exhibit appropriate molecule—metal interactions and chemical reactions for catalytic activity.

It has been discovered that certain organic polymers with polar functional groups are particularly useful constituents in such aerogels. These preferred organic polymers can be dissolved in the solution in which the silica source is provided, which form with the silica source, a clear sol and subsequent gel, which can be placed in a chemical form that leads to interaction with the metal ions at a pH at which the silica network is stable, and which are not extracted to a deleterious extent by interactions with solutions, liquids, or supercritical fluid in the preparation process. For the case in which the silica source is an alkoxide, such as tetraethyl orthosilicate (TEOS), formation of a monolithic gel occurs preferably under acidic conditions with water and alcohol present. Note that TEOS can also be written as tetraethoxy silane, and it belongs to the class that includes tetraalkoxysilanes in general, trialkoxy alkyl silanes, dialkoxy dialkyl silanes and other closely related compounds, which can hydrolyze to give 2, 3, or 4 hydroxy groups with which to form part or all of a silica network, such as would be well known to one reasonably skilled in the art. Other alternate silica sources could be employed. Thus, the preferred organic polymer must have sufficient solubility to permit its incorporation in the sol and not precipitate to produce a visual cloudiness during gelation. Moreover, it must form a sufficiently strong interaction with the other constituents of the gel such that it is not extracted to a deleterious extent by solutions used to introduce the metal ion-containing species and so that it is not extracted to such an extent by alcohol that is used to replace other liquids in preparation for the supercritical extraction. Finally, the preferred organic polymer must have the functionality necessary to interact with the metal ion-containing species under conditions, such as conditions reflected by pH or temperature, in which both the silica and the polymer is chemically stable.

A preferred organic polymer that has these characteristics is chitosan, which is the name given to materials derived from chitin by deacylation. These materials vary in degree of deacylation and molecular weight according to the source of the chitin and the deacylation process. Commercial chitosan typically is prepared from chitin from the skin or shell of anthropods and thus often is a recovered waste product of the fishing industry. Chitosans in the range of 50 to 100% deacylated (replacement of 50 to 100% of acylamine groups by amine groups) and molecular weights in the 35,000 to 3,000,000 Dalton can be used. More preferred are chitosans in the range of weight average molecular weights of 150,000 to 2,500,000 g/mol and degrees of deacylation from about 70 to about 100%. Most preferred are chitosans with such weights of 300,000 to 2,100,000 g/mol and degrees of deacylation from about 80 to about 100%.

Chitosan is a copolymer containing both beta-(1-4)-2-acetamido-2-deoxy-D-glucose and beta-1(1-4)-2-amino-2-deoxy-D-glucose units. The amine group of the deacylated units can form coordinate covalent bonds to metal ions by complexation. The extent to which the amine group, which coordinates to metal ions, is present relative to its protonated form depends on the pH of the system. A characteristic of chitosan that is unusual for compounds with primary amine groups is that the pKa is about 6.3. This means that a significant fraction of the groups are in the amine form at pH less than 7. Furthermore, this also means that chitosan can coordinate effectively at pH less than 7 rather than at the higher pH values at which the silica network is subject to base hydrolysis and instability.

Another characteristic of chitosan is that it has OH groups. Without being limited to any particular theory, it is contemplated that the OH groups assist in the interaction of the polymer with the silica as it is present in the various stages of preparation and in the final form of aerogel material. This characteristic as well as the interactions of other groups of the chitosan copolymer with the silica, and of the OH groups with the metal ions and with other chitosan units may be the reason that the polymer is not extracted to a deleterious extent when the wet gel is exposed to aqueous metal ion-containing solutions and alcohols.

Other organic polymers suitable for forming the aerogels of this invention include, but are not limited to, alginic acid, gelatin, pectic acid (from apples), carboxylate-modified poly (acrylamide), carboxylate modified chitosan, polyvinyl alcohol that is about 100% hydrolyzed and of weight average molecular weight in the 100,000 to 200,000 range, poly (acrylic acid). Other carbohydrates with polar groups, such as carrageenans, modified starches such as amylopectin, epichlorohydrin or alkyene oxide modified amylopecin and certain dextrins. Clearly polymers such as polyamines and others fulfilling the role of the polymer but whose polar groups are thiol, thioether, phosphate, also could be useful in the formation of these aerogels using the methods of the invention.

It has been discovered that the aerogels of this invention can be friable so that they are easily broken into relatively small pieces for use as particles. The minimum particle size is about 25 nanometers. When the friability is combined with the inclusion of catalytically useful metal ions and the reduction, oxidation and other reaction products, the aerogel of the present invention can be used as a catalyst agent or as a vehicle therefor.

Another important feature of the aerogels of the present invention is their transparency to light in certain wavelength regions. This feature, particularly when taken in combination with the high surface areas and reactive metal ions and absorptive structure of the aerogels, has provided a wide array of novel uses for the aerogels as detection elements and optical elements. This transparency is immediately evident in certain regions of the visible spectrum, at which they are colored but relatively transparent, resembling pieces of colored but clear glass. Absorption of gases by the aerogels can cause a color change in the aerogel. Representative examples of gases that may be absorbed by the aerogels of the present invention, include but are not limited to, $CO$, $H_2$, $H_2O$, $NH_3$, $CO_2$, $N_2O_4$, $NO$, and $NO_x$. Thus, gas absorption can be detected using the aerogel as the detection element and a suitable light source and detector. Absorption of gases which cause changes to the infrared or near infrared spectrum of the aerogels in the region where the aerogels have a spectral transmission of greater than about 10% provides an element for a detector for those gases. It has been discovered that detection of $CO$, $NO$, and $N_2O_4$ with detection in the mid infrared region provides a detector element for these gases.

The monolithic aerogels of the invention have high porosity and surface area and comprise metal containing species, such as metal ions. A representative listing of suitable metal ions includes, but is not limited to, Co, Cu, Fe, Cr, Ni, Mn, Rh, Ru, Ir, Pd, Pt, Au, Yb, Er, Eu, Sm, and Dy. The metal ions can be selected from those that interact with selected impurities in a gas or gas stream and remove or transform them. Thus, the invention of the aerogels as gas absorber in a setting where a monolithic material is required is exemplified by the absorbance of NO by a ruthenium—containing chitosan silica aerogel.

The metal ion-containing aerogels are imaged photolytically, by using x-ray or ultraviolet irradiation, to produce metal nanoparticles.

Additionally, magnetic particles, such as ferromagnetic particles, including iron or gamma $Fe_2O_3$, can be included in the metal ion-containing aerogel. Preferably, the materials range in particle size from about 0.5 to about 100, including from about 2 to about 25.

The present invention is further illustrated by the following examples. It is to be understood that the present invention is not limited to the examples, and various changes and modifications can be made in the invention without departing from the spirit and scope thereof.

EXAMPLES

Measurements were made on the materials discussed in the Examples below using a range of methods and equipments. These are briefly discussed as follows:

Infrared Spectra were measured in transmission using a Perkin-Elmer 1600 FTIR in the 500-4000 $cm^{-1}$ range. The samples included thin monolithic pieces of aerogels and KBr pressed pellets containing aerogel powder. Ultraviolet-visible Spectra were measured in transmission with a Hewleff-Packard HP8452 Spectrometer.

Microscopic Studies were performed with light and electron microscopes. Transmission Electron Microscopic (TEM) images were measured using a Philips 420 TEM with an accelerating voltage of 120 kV. The samples for TEM studies were prepared by grinding monolithic or large particles and depositing the fine particles onto carbon-coated copper grids (holey carbon, lacy film). Visible light microscopic image were taken with an Olympus VANOX AHMT3 optical microscope.

Powder diffraction by X-ray (XRD) was measured on powder samples at 25° C. using a Siemens Diffractometer D5000 (Cu-kα radiation, 40 kV and 35 mA) at a typical scan rate of 0.02 o/s (2θ). X-ray photoelectron Spectra (XPS) was measured using a Perkin-Elmer (Physical Electronics) 5500 Multi-technique Surface Analyzer with an aluminum X-ray source and 300 μm aperture. In the case of the sample X—$SiO_2$—$FeO_x$ (Example 26) a monolithic sample was scanned both before and after sputtering the surface in ultrahigh vacuum with Ar ions.

Magnetic measurements were made on powdered samples, which were prepared by grinding. A powder sample was placed in a 2.5 inch-long thin plastic tube, which was sealed at one end. This was then placed into a longer plastic tube, and the assembly was connected to the sample probe and inserted into an MPMS-5S or an MPMS-XL model Superconducting Quantum Interference Device (SQUID). Magnetic properties of the powders were measured using the SQUID. Measurements were made both at 25° C. and, as required, low temperatures (5K, 10K). Zero Field Cooling (ZFC) plots were measured by cooling the samples in zero magnetic fields to the desired temperatures, a specific magnetic field was applied, and temperature scanning was done. The Field Cooling (FC) plot was measured during the cooling temperature scan in specific magnetic field.

Example 1

A mixture of 12.5 ml of tetraethylorthosilicate (TEOS), 40 ml of an aqueous solution containing 1 wt % of 80% deacylated chitosan (Fluka molecular weight 2,000,000 Dalton) and 1 wt % acetic acid and 0.9 ml of glacial acetic acid was prepared and stirred at room temperature for 8 hours. A clear, colorless and viscous solution formed. Portions were poured into polystyrene boxes (2 inch by 2 inch and about 1 inch high). They gelled as films and were aged for 12 hours. A solution (ca.5 ml) of absolute ethanol and ammonium hydroxide (40:1 v/v) was added into the gel. Then the supernatant solution and liquid in the gel were replaced with absolute ethanol by exchanging the supernatant at least for 5-8 times during a period of 5-8 days to produce full wet gels containing ethanol. The gels were subjected to supercritical fluid extraction (SCE) with carbon dioxide $CO_2$ under supercritical condition, typically P=1400 Psi and temperature at 36° C. This produced an aerogel with about 10% (w/w) chitosan. Other aerogels were produced in the 1-15% (w/w) chitosan range.

Example 2

Wet gels produced in Example 1 were treated to one more step before SCE in which the supernatant ethanol was replaced by a solution made by dissolving $HAuCl_4$ in ethanol. By controlling the stoichiometric ratio between Au(III) and the amine containing groups present in the chitosan in gel, gels with different gold concentrations were obtained. In one set of experiments, gels with ca. 10% X were treated with $HAuCl_4$ to obtain gels. The ratio of Au(III)/$NH_2$-containing groups (abbreviated as Au(III)/$NH_2$ herein) was varied from about 1:120 to 1:5 with specific values of 1:90, 1:60, 1:30, 1:15 and 1:5 in this example. Following supercritical fluid extraction by carbon dioxide, clear, yellow monolithic pieces of these aerogels, labeled as X—$SiO_2$—Au(III) and specified by Au(III)/$NH_2$ ratio were obtained. Infrared spectra showed that Au(III) was coordinated to amine groups of chitosan in the aerogel.

Example 3

A clear yellow monolithic or powdered aerogel produced in Example 2 was put in an aluminum tray and was exposed in air for 8 hours to UV light about 10 cm from a GE G25T8 low pressure Hg arc lamp with a quartz envelope. Over 95% of the lamp output is at 254 nm. The power of the radiation at the aerogel was less than 20 mW/cm². The clear yellow aerogel turned to red color after the exposure. Infrared and UV-Visible spectral properties of this material were studied. TEM also was used to study the gold nanoparticles. A characteristic plasmon resonance absorption peak for gold nanoparticles appeared in the UV-Vis spectra near 520 nm. After UV exposure, absorption (shoulder) appeared at about 1700 cm$^{-1}$, which is interpreted as being due to species produced by oxidation of an organic entity, possibly the chitosan in the aerogel. TEM pictures showed gold nanoparticles dispersed in the aerogel matrix. The mean gold sizes varied from 8 nm to 85 nm.

Example 4

A clear yellow monolithic (X—$SiO_2$—Au(III)) at Au(III)/$NH_2$ ratio 1:30 aerogel produced in Example 2 was covered in part by a metal mask and exposed to UV light (GE G25T8). The metal of the mask covered part of the aerogel and the holes in the mask allowed UV light to impinge upon part of the aerogel. After exposure at ca. 8 cm distance for 8 hours, the aerogels showed gold nanoparticle patterns that were the same as the holes in the mask. A microscopic photograph of the patterned gold nanoparticle aerogel was taken.

Example 5

Compound 5 in Table 1 (biotinylated disulfide) was prepared by reacting cystamine dihydrochloride and (+)-biotin N-hydroxy-succinimide ester (NHS-Biotin) (98%, Sigma) in DMSO/DMF with pyridine as catalyst at 25° C. to effect the reaction below, which is analogous to the reaction reported by C. Yam, et al. [J. of Colloid and Interface Science, 235, 183-189, (2001)]. Compound 6 (biotinylated thiol) was synthesized as reported by C.-M. Pradier, et al. [Surface and Interface Analysis 34, 67-71, (2002)]. Compound 1-4 in Table 1 were purchased and used as received.

TABLE 1

Sulfur containing compounds used to associate with gold nanoparticles.

| No | Label | Structure |
|----|-------|-----------|
| 1 | Cysteamine hydrochloride | HS–CH$_2$CH$_2$–NH$_2$•HCl |
| 2 | Cystamine dihydrochloride | (S–CH$_2$CH$_2$–NH$_2$•HCl)$_2$ |
| 3 | 11-Mercapto-1-undecanol | HS–(CH$_2$)$_{11}$–OH |
| 4 | 11-Mercaptoundecanoic acid | HS–(CH$_2$)$_{10}$–COOH |
| 5 | Biotinylated disulfide | Biotin–C(O)NH–CH$_2$CH$_2$–S–S–CH$_2$CH$_2$–NH$_2$•HCl |

TABLE 1-continued

Sulfur containing compounds used to associate with gold nanoparticles.

| No | Label | Structure |
|---|---|---|
| 6 | Biotinylated thiol | |

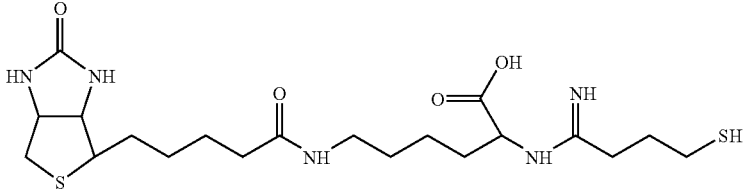

Synthetic Pathway Used in the Synthesis of Compound 5

Examples 6 through 19

Monoliths of X—SiO$_2$—Au(III) aerogels with various Au(III)/—NH$_2$ (nominal; i.e., Au(III)/NH$_2$-containing groups including —NH$_2$ and —NH$_3^+$) were used to prepare Au(0) nanoparticles in the presence of thiol or disulfide containing compounds under UV irradiation. The compounds are specified in Table 1 above, and the combinations of compound and aerogel are specified in Table 2 below. Thus, a 0.02 g X—SiO$_2$—Au(III) aerogel piece was soaked in 3 ml of 0.001 M solution of a sulfur-containing compound for 15 hours. Each piece then was irradiated for 8 hours with light from a G25T8 lamp. The power from this lamp is about 21 mw/cm$^2$ at 254 nm at the 8 cm distance at which the sample was placed. The samples turned to shades of red. The TEM method was used to measure the nanoparticles formed, and the average sizes observed are listed in Table 2. In the presence of the sulfur-containing compounds, the mean size of gold nanoparticles was controlled. Thus, for the same Au(III)/—NH$_2$, different sulfur-containing compounds lead to different sizes of gold nanoparticles, as shown in Table 2. For instance, for Au(III)/—NH$_2$ ratio as 1:15, the average diameters in 16.6 or 17.9 nm in the presence of cysteamine or cystamine, respectively. In the presence of 11-mercaptoundecanoic acid or 11-mercapto-1-undecanol, the average diameter of the gold nanoparticles is 9.0 or 10.5 nm respectively. In the presence of compound 5 or 6, the average diameter is about 2 nm.

TABLE 2

| Example | Au(III)/—NH$_2$ in Au(III)-X- Silica aerogel | Sulfur compound | Compound # in Table 1 | Mean Size of Au Nanoparticles ± 0.5 (nm) |
|---|---|---|---|---|
| 6 | 1:30 | Cysteamine | 1 | 12.7 |
| 7 | 1:30 | Cystamine | 2 | 8.8 |
| 8 | 1:30 | 11-Mercaptoundecanoic acid | 4 | 8 |
| 9 | 1:30 | 11-Mercapto-1-undecanol | 3 | 8 |
| 10 | 1:15 | Cysteamine | 1 | 16.6 |
| 11 | 1:15 | Cystamine | 2 | 17.9 |
| 12 | 1:15 | 11-mercaptoundecanoic acid | 4 | 9.0 |
| 13 | 1:15 | 11-Mercapto-1-undecanol | 3 | 10.5 |

TABLE 2-continued

| Example | Au(III)/—NH$_2$ in Au(III)-X- Silica aerogel | Sulfur compound | Compound # in Table 1 | Mean Size of Au Nanoparticles ± 0.5 (nm) |
|---|---|---|---|---|
| 14 | 1:15 | Biotinylated disulfide | 5 | 2 |
| 15 | 1:15 | Biotinylated thiol | 6 | 2 |
| 16 | 1:5 | cysteamine | 1 | 13.6 |
| 17 | 1:5 | Cystamine | 2 | 10.4 |
| 18 | 1:5 | 11-mercaptoundecanoic acid | 4 | 8.5 |
| 19 | 1:5 | 11-Mercapto-1-undecanol | 3 | NA |

Example 20

Wet gels produced in Example 1 were treated to one more step just before SCE. The supernatant ethanol was replaced by 5 ml of a solution made by dissolving ferrous chloride FeCl$_2$ in ethanol solution. The interaction between the gel and this solution was allowed to proceed for three days. Then the FeCl$_2$/ethanol solution was replaced by ethanol, and then the wet gel was processed by supercritical fluid extraction to produce X—SiO$_2$—Fe(II).

Example 21

Wet gels produced in Example 1 were treated to one more step just before SCE. The supernatant ethanol was replaced by 5 ml of a solution made by dissolving iron(III)acetylacetonate Fe(acac)$_3$ in ethanol solution. The interaction between the gel and this solution was allowed for 1 week to proceed. By varying the ratio between Fe(III) and NH$_2$-containing groups in chitosan, wet gels with Fe(III)/NH$_2$ (nominal) equal to 1:20 and 1:10 were made. After supercritical extractions as described above, X—SiO$_2$—Fe(III) aerogels with nominal Fe(III)/NH$_2$ ratios 1:20 and 1:10 were obtained. They were clear, orange-colored aerogels.

Example 22

Pieces (monolithic or powders) of blank chitosan-silica aerogel (ca 10% w/w chitosan), (i.e. X—SiO$_2$ with no metal ions), were put in a long evacuable glass tube, the tube was connected to a vacuum line and evacuated (P=1*10$^{-3}$ Torr) for 15 mins. Then iron pentacarbonyl, Fe(CO)$_5$, vapor was admitted to the vacuum line to reach P=ca. 20 mmHg. The aerogel absorbed some of the Fe(CO)$_5$ by soaking in the vapor for 10 min, and residual vapor remained in the tube. The tube then was heated to 190° C. and maintained at this temperature for 1 hour. After evacuating the gas, a black aerogel product, X—SiO$_2$—Fe, was obtained. Its XRD, TEM and magnetic properties were studied. XRD showed that Bcc structure Fe was formed in the aerogel. The Fe nanoparticles had sizes in the range 5-26 nm and average size of about 10 nm. The aerogel was attracted strongly to a permanent magnet at room temperature. SQUID measurements showed that it was ferromagnetic.

Example 23

Pieces (monolithic or powders) of X—SiO$_2$—Au(0) aerogel produced by the method of Example 3, were put in a long evacuable glass tube and the tube was connected to a vacuum line and evacuated (P=1*10$^{-3}$ Torr) for 15 min. Then iron pentacarbonyl vapor was admitted to the vacuum line to reach P=ca. 20 mmHg. The aerogel absorbed some of the Fe(CO)$_5$ by soaking in the vapor for 10 mins and residual vapor remained in the tube. The tube then was heated to 190° C. and maintained at this temperature for 1 hour. After evacuating remaining gas, a brown aerogel product, X—SiO$_2$—Au(0)-Fe, was obtained. XRD, TEM and magnetic properties were studied. XRD showed that fcc gold nanoparticles were present and that bcc iron nanoparticles were formed in the aerogel. The gold nanoparticles had an average diameter of about 25 nm and the iron particles (5-25 nm) had an average diameter of about 10 nm. This material was ferromagnetic at room temperature.

Example 24

Monolithic samples of X—SiO$_2$ aerogel (ca 10% w/w chitosan) were placed in a tube and the tube was connected to vacuum line for 15 min. Each sample was exposed for 10 mins to Fe(CO)$_5$ vapor (P=ca. 20 Torr) in an evacuable glass cell fitted with sapphire and KBr windows. After evacuation of the residual vapors, they were irradiated for 30 min by Ar laser operating at 488 nm with output power 0.4 W. Following irradiation, the aerogels turned dark at the incident spot. Upon exposure of the sample to air, the aerogel X—SiO$_2$—FeO$_x$ was formed.

Example 25

Monolithic samples of X—SiO$_2$—Au(0) aerogels were placed in a tube and the tube was connected to a vacuum line for 15 min. Then each sample was exposed for 10 mins to Fe(CO)$_5$ vapors in an evacuable glass cell fitted with sapphire and KBr windows. After evacuation of the residual vapors, each was irradiated by for 30 min by Ar laser operating at 488 nm with output power 0.4 W. Following irradiation, the aerogels turned dark at the incident spot. Upon exposure of the sample to air, the aerogel X—SiO$_2$—Au(0)-FeO$_x$ was formed.

Example 26

Monolithic samples of X—SiO$_2$ aerogels (ca 10% w/w chitosan) were put in a glass tube and the tube was connected to a vacuum line for 15 min and then was exposed for 10 mins to Fe(CO)$_5$ vapors in an evacuable glass cells fitted with sapphire and KBr windows. After evacuation part of the residual vapors, they were irradiated for 7 hours by He—Ne laser operating at 633 nm with output power 0.4 mW. Following irradiation, the aerogels turned dark at the incident spot. Following admission of air and reclosure, the aerogel darkened to brown-black color. The aerogel X—SiO$_2$—FeO$_x$ was formed. XPS showed that on the surface it mainly was Fe$_2$O$_3$ and, after sputtering, in the depth it was FeO or Fe$_3$O$_4$. XRD showed that the resultant iron oxide materials were amorphous. And magnetic measurement showed the materials was ferromagnetic at low temperature and superparamagnetic at room temperature. The blocking temperature was about 75 K.

Example 27

Monolithic samples of X—SiO$_2$—Au(0) aerogels were placed in a glass cell fitted with sapphire and KBr windows and the cell was connected to a vacuum line at ca 1*10$^{-3}$ Torr for 15 min. Then the aerogel was exposed for 10 min to Fe(CO)$_5$ vapor P ca 20 mmHg. After evacuation of part of the residual vapor, it was irradiated for 7 hours by He—Ne laser operating at 633 nm at power=0.4 mW. Following irradiation, the aerogel turned dark at the incident spot. Following admission of air and reclosure, the aerogel darkened to brown-black color. The aerogels X—SiO$_2$—Au(0)-FeO$_x$ was formed. XRD showed that only gold was crystalline and iron oxide was amorphous. Magnetic measurements showed it was ferromagnetic at 5K, and at room temperature, it was superparamagnetic.

Example 28

A powdered sample of X—SiO$_2$—FeO$_x$ aerogels produced in Example 26 was placed in a furnace and heated in air at 500° C. for 10 hours. After cooling down, the aerogel X—SiO$_2$-α-Fe$_2$O$_3$ was formed. Its XRD and magnetic properties were studied on this material. XRD work showed that the amorphous iron compounds changed to α-Fe$_2$O$_3$. Magnetic measurement showed this material was still ferromagnetic at 5K and was paramagnetic at room temperature.

Example 29

A powdered sample of X—SiO$_2$—Au(0)-FeO$_x$ aerogel produced in Example 27 was placed in a furnace and heated at 500° C. in air for 10 hours. After this annealing, the aerogel X—SiO$_2$—Au(0)-α-Fe$_2$O$_3$ was formed. Its powder X-ray diffraction and magnetic properties were studied. XRD worked showed that both gold crystals and α-Fe$_2$O$_3$ crystals presented in the aerogel. Magnetic measurements showed that at low temperature (5K), this material was still ferromagnetic. And it was paramagnetic at room temperature.

Example 30

A monolithic sample of X—SiO$_2$—Au(III) aerogel produced in Example 2 was placed in a tube and the tube was connected to a vacuum line (ca 1*10$^{-3}$ Torr) for 15 min. Then the aerogel was exposed for 10 min to Fe(CO)$_5$ vapor P=ca. 20 mmHg. After exposure, the yellow transparent aerogel became purple colored. Following admission of air and reclosure, the aerogel darkened to a brown-black color. The aerogel X—SiO$_2$—Au(0)-FeO$_x$ was formed. Its UV-Vis spectrum was measured; evidence for gold nanoparticles was present in the form of its plasmon resonance peak in the spectrum.

Example 31

A small monolithic sample of X—SiO$_2$—Au(0)-Fe aerogel produced in Example 23 was placed in a vial containing 2 ml 0.05M 11-mercaptoundecanoic acid acetone solution. After soaking for 4 hours in the solution, the aerogel was taken out and washed by acetone 3 times. After drying the aerogel in the vacuum its infrared spectra was measured. Among the key features were absorbance at 1700 cm$^{-1}$ and 1540 cm$^{-1}$, which were believed to correspond to the carboxylic acid group of molecules attached to gold nanoparticles by thiol, and carboxylate group of molecules attached to Fe nanoparticles, respectively.

Example 32

A powdered sample of X—SiO$_2$—Au(III) aerogel with X (10% w/w) was dispersed in a solution containing polyvinyl alcohol and the dispersion was coated onto a glass slide and dried. The coated slide was covered with an aluminum mask with several holes in it, and the assembly was placed about 8 cm from the UV lamp described in Example 4 for about 1.5 hours. When the mask was removed, the regions where the mask had holes was red from the formation of Au(0) nanoparticles in the irradiated regions.

The development has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

We claim:

1. A process for producing a superparamagnetic aerogel material containing zero-valent metal particles comprising:
    providing an aerogel material comprising silica, at least one organic polymer with a polar functional group and a metal ion-containing species, wherein the polar functional group of the organic polymer is selected from the group consisting of amine, carbonyl, acylamine, protonated amine, hydroxyl, and carboxyl groups;
    irradiating the aerogel material with ultraviolet light sufficiently to cause the photoreduction of the metal ion-containing species to produce the zero-valent metal particles; and
    reacting the photoreduced aerogel material with a precursor to a superparamagnetic material to produce the superparamagnetic aerogel material containing the zero-valent metal particles.

2. The process of claim 1, wherein the organic polymer is selected from the group consisting of a chitosan with a deacylation degree 50 to 100%, pectic acid, and alginic acid.

3. The process of claim 2, wherein the chitosan has an average molecular weight of from about 35,000 to about 3,000,000.

4. The process of claim 1, wherein the metal ion-containing species is selected from the group consisting of Co, Cu, Fe, Cr, Ni, Mn, Rh, Ru, Ir, Au, Pd, Pt, Yb, Er, Eu, Sm, and Dy.

5. The process of claim 1, wherein the metal ion-containing species has an oxidation state from one to six.

6. The process of claim 1, wherein the silica is selected from the group consisting of tetraalkoxy silanes, trialkoxyalkyl silanes, silicic acid, alkali silicates, precipitated silica, silica aerogel, alkaline earth silicates and combinations thereof.

7. The process of claim 1, wherein the superparamagnetic material is a volatile organometallic compound comprising iron.

8. The process of claim 7, wherein the organometallic compound comprising iron is iron carbonyl.

* * * * *